United States Patent
Ronaldson et al.

(10) Patent No.: US 7,043,411 B1
(45) Date of Patent: May 9, 2006

(54) MONITORING AND ANALYSIS (75) Inventors: John Paul Ronaldson, Calderbridge (GB); Robert Jonathan Sharpe, Calderbridge (GB)

(73) Assignee: British Nuclear Fuels PLC, Cheshire (GB)

( * ) Notice: Subject to any disclaimer, the term of this patent is extended or adjusted under 35 U.S.C. 154(b) by 0 days.

(21) Appl. No.: 09/402,968

(22) PCT Filed: May 15, 1998

(86) PCT No.: PCT/GB98/01397

§ 371 (c)(1),
(2), (4) Date: Jan. 12, 2000

(87) PCT Pub. No.: WO98/53341

PCT Pub. Date: Nov. 26, 1998

(30) Foreign Application Priority Data

May 22, 1997 (GB) .................... 9710489

(51) Int. Cl.
G06G 7/48 (2006.01)
G09B 25/00 (2006.01)

(52) U.S. Cl. .................... 703/6; 434/370.05

(58) Field of Classification Search ............ 703/6; 434/370.05
See application file for complete search history.

(56) References Cited

U.S. PATENT DOCUMENTS 5,423,683 A * 6/1995 Hurst et al. ................ 434/218

FOREIGN PATENT DOCUMENTS

EP 0 193 937 A2 9/1986

OTHER PUBLICATIONS

Buck et al., "Plutonium Inventory Measurements During Decommissioning Operations," 1990, Waste Management Conference in Tuscon, Arizona.

* cited by examiner

Primary Examiner—Hugh Jones
(74) Attorney, Agent, or Firm—Workman Nydegger (57) ABSTRACT A method and apparatus for monitoring a neutron source are provided, the method comprising: i) providing a plurality of neutron detectors (16) at known positions relative to one another; ii) monitoring the neutron detection rates for the detectors caused by the unknown source(s); iii) proposing a model source location(s) relative to the detectors and an activity level for the model source(s); iv) predicting neutron detection rates for the model source(s); v) comparing the predicted and actual detection rates; vi) adjusting the model source location(s) and/or activity(s) to reduce the difference between the predicted and actual detection rates. The reduced and preferably minimized, difference between the predicted and actual detection rates leads to a model source location(s) and activity(s) which represents an accurate equivalent to the unknown. The location information and/or activity information may be conveyed to the operator of the method.

30 Claims, 5 Drawing Sheets

MONITORING AND ANALYSIS

This invention concerns improvements in and relating to monitoring and analysis, particularly, but not exclusively, of items containing or contaminated by neutron radiation sources.

The accurate determination of the extent and location of neutron sources present in equipment is important for a variety of reasons. Within the nuclear power and reprocessing industry for instance it is important to have as much information as possible about equipment that is being decommissioned. Strict safety standards are applied to the decommissioning and subsequent disposal of equipment which has come into contact with neutron sources during its life. In particular it is important to ensure that any given volume of waste incorporating a part of the decommissioned equipment does not contain neutron sources above a certain level so as to provide the necessary criticality safety factor.

Conventional techniques such as the "Versatile Passive Neutron Monitor, model N93" from Harwell instruments use a number of individual neutron detectors which are positioned as far as possible around the piece of equipment to be decommissioned. Significant problems can occur where access around the whole of the area to be monitored is not available, due to adjacent units or ventilation systems over the unit for instance.

The $^3$He neutron detectors provide an output signal which is summed and analysed using the technique of Neutron Coincidence Counting, NCC. The NCC result is used to give an indication of the rate of spontaneous fission's occurring within the equipment by means of a neutron detection efficiency factor. The rate is normally largely attributable to $^{240}$Pu fission's.

The neutron detection efficiency factor must itself be determined by providing a known source, normally $^{252}$Cf, in the target equipment for the analysis. The increase in response from the detectors is analysed. In certain cases the test source cannot be provided in the equipment itself and as such a dummy test must be done with the detectors provided in an identical spacial configuration to that used around the equipment but without the equipment present.

In either event the actual source location within the equipment is a very significant factor. As no information is available on this the test must be performed on a worst case basis, (the actual location with the worst detection efficiency). In order to meet the safety standards, however, this can lead to a gross over estimate in the amount of neutron source in the particular sample. Over estimates by several hundred percent frequently occur. Any over estimate increases the volume into which the equipment must be dispersed for disposal and as a consequence increases the cost very significantly.

As well as the overall level for neutron source within a waste sample there is also an increasing need to know where within that volume the source is provided. Such information is not available from the technique of NCC at all.

According to a first aspect of the present invention we provide a method of monitoring a neutron source comprising:— i) providing a plurality of neutron detectors at known positions relative to one another;

ii) monitoring the neutron detection rates for the detectors caused by the unknown source(s);

iii) proposing a model source location(s) relative to the detectors and an activity level for the model source(s);

iv) predicting neutron detection rates for the model source(s);

v) comparing the predicted and actual detection rates;

vi) adjusting the model source location(s) and/or activity(s) to reduce the difference between the predicted and actual detection rates.

The reduced and preferably minimised, difference between the predicted and actual detection rates leads to a model source location(s) and activity(s) which represents an accurate equivalent to the unknown. The location information and/or activity information may be conveyed to the operator of the method.

The neutron source may comprise one or more elements or compounds and/or one or more isotopes of an element in elemental and/or compound form and/or mixtures thereof. The neutron source maybe naturally occurring and/or the product of fission reactions. Plutonium and $^{240}$Pu, in particular, may comprise the neutron source which requires monitoring.

The neutron source may be present together with other materials. Non-neutron source elements or compounds may be present and/or water, plastics, vitrified materials such as glass or other substances.

The location of the neutron source maybe a piece of equipment, such as a glove box, ventilation unit or the like; a piece of a component, such as a section of a glove box; a component of a piece of equipment, such as a filter or length of pipework; or a container, such as a drum, box or other package type. The container maybe sealed. The location maybe an amount of waste material, such as material destined for disposal.

The neutron detectors may be of the $^3$He type. The detectors maybe provided with one or more of polyethylene, boron or cadmium. The detectors maybe provided with an elongate active area. A length of between 0.25 and 1.5 m maybe used, with a length of between 0.4 and 0.6 m preferred. A diameter of between 0.01 and 0.08 m maybe used.

The neutron detectors may be provided along a side of the volume or item to be monitored. More preferably the detectors are provided along at least two sides of the volume. Preferably detectors are provided along all six sides of the volume; that is all four "vertical sides", the top and bottom.

Preferably a plurality of the detectors are horizontally and vertically separated from one another.

Alternatively or additionally where the detector is elongate one or more of the detectors may be inclined at an angle to one or more of the others. Preferably an angle of substantially 90 degrees is employed.

Alternatively or additionally two or more detectors may be paired together with two or more other detectors, one detector in first set being treated in combination with the correspondingly positioned detector in the other set, with which it is paired, as a single detector. Most preferably all the detectors in a given set are paired with correspondingly positioned detectors in the other set or sets to give a series of such single detectors.

Preferably the detectors are portable. Preferably the positions of detectors relative to one another can be varied. In this way configuration for various volume sizes to be monitored can readily be provided.

The relative positions of the detectors to one another and/or relative to the source may be considered in 2 dimension (for instance where contamination of a flat surface is considered) but most preferably is considered in 3 dimensions.

The relative positions may be expressed in terms of an x, y co-ordinate system or in terms of a distance and angle system for 2 dimensions. For 3 dimensions the relative positions may be defined in terms of an x, y, z co-ordinate system or in terms of a distance and 2 angle system.

The coordinate system or angle system may be defined about a fixed point corresponding to one of the detectors or to a fixed point on the item to be monitored such as a corner. For the co-ordinate system one or more of the axis may be defined to correspond to one or more of the edges of the item to be monitored. For the angle system one or more of the edges of the item to be monitored may form the axis relative to which the angle or angles are determined.

Predetermined co-ordinate axis and/or fixed point(s) details may be pre-set for a given type of article. Predetermined detector locations on the article may be set for a given type of article. In this way stored calibration data could be applied each time an analysis is performed, on a given type of glove box for instance, as consistent locations are used.

The signals from individual detectors are preferably fed to an amplifier and most preferably also to a discriminator.

Preferably the signals are recorded and/or summed to provide a count rate for each of the detectors separately. The signal sequence and/or the signal count may be stored for latter processing. Preferably the results from one or more individual detectors are analysed to produce a coincidence count rate. Alternatively and/or additionally the results from one or more pairs and/or sets of detectors may be analysed to produce coincidence count rates. Alternatively and/or additionally the results from all the detectors may be analysed to produce coincidence count rates.

Preferably the monitoring of the signals is performed for a period of 1 hour to 24 hours. This provides a sufficiently representative count rate in most cases for accurate analysis.

In one embodiment one source location is selected for the first trial solution.

A further source location may be introduced if the model to actual comparison is minimised, as far as possible, but the discrepancy between model and actual results, or a function thereof, is high in absolute terms.

In an alternative embodiment a plurality of sources may be employed in the first trial solution. Preferably the number of sources is at least 3 and more preferably at least 4. Preferably at least two sources are provided at different locations.

The number of sources may be reduced in further trial solutions if the model to actual comparison is minimised, and would not be increased beyond a certain tolerance if one of the sources were removed.

Preferably the predicted detection rate for a detector is determined from stored calibration data. Preferably the calibration data is obtained by determining the actual count rates for a single detector with varying source locations and/or activities. The calibration data for a single detector may be applied in use to other detectors of that type.

The calibration data may be obtained for the detectors in their relative positions to one another of use. The calibration data for individual detectors may be different. The calibration data may be obtained with the detectors positioned relative to the volume or item to be monitored, ie around a glove box, or they may be obtained with the detectors positioned relative to a dummy version of the volume or item to be measured, such as a clean glove box or around an equivalent volume or free space. The calibration data may be extrapolated from a number of calibration tests to provide a set of detection efficiency contour information. The calibration data may relate to 2 dimension or more preferably 3 dimension variation in the calibration source location and activity.

The predicted count rates and actual count rates may be compared by summing the difference between the two sets of values. The summing of modulated such values is to be preferred. Ideally the sum of the squares of the differences is employed as the comparison between the actual and model count rates. A chi-squared comparison may be used, for instance $$X^2 = \sum_{all\ detectors} \frac{(predicted - measured)^2}{(error)^2}$$

Preferably the comparison value is reduced and/or minimised in seeking a solution. The count rates are preferably compared as neutron per second rates.

Preferably a revised trial source location and/or activity is provided unless the comparison meets a certain desired limit; in the case of the summed squared differences a value below the desired limit may be employed.

If the desired limit is not reached a further trial source location and/or activity is provided. In an alternative form the number of trial source locations may be reduced and/or the activity varied. A reduction in the discrepancy is sought as a result in either case; an iterative process maybe employed.

Preferably the revised trial source location and/or activity is selected by determining a comparative function for the actual and model results, determining the effect of slight variations in the model solution and adjusting the next model solution values according to the directional and/or magnitude effect suggested by the slight variation. Preferably the comparative process and slight variation effect is determined separately for each dimensional and activity variable. Preferably the individual variation effects are combined to give the variation between one model solution and the next.

Preferably a chi-squared function is determined for the variation of each of the dimensional co-ordinates and for the activity. Preferably the gradient of the respective function at a small value one side of the model solution value is compared with the gradient a small variation in that value on the other side of the model solution value. Preferably a factor seeking to reduce that $chi^2$ or gradient is obtained. Preferably the factors from the dimensional co-ordinates and activity are combined to produce a vector. Preferably the direction of the vector arises from the variations in the contributing values intended to reduce the $chi^2$ or gradient. Preferably the magnitude of the vector arises from the variations in the contributing factors according to the steepness of the gradient.

Preferably a model solution is compared with the previous model solution. If the model solution represents a poorer fit than the previous model solution, preferably a revised model solution is applied. Preferably the revised model solution comprises a solution intermediate in one or more values, most preferably all, to the model solution and the previous model solution, where a vector is applied in obtaining the model solution from the previous model solution preferably half that vector is applied as the revised model solution. If the revised model solution represents a poorer fit than the previous solution preferably a further revised model is applied. Preferably the further model solution comprises a solution intermediate in one or more values, preferably all, to the revised model solution and previous model solution. Where a vector is applied preferably the further revised solution represents a quarter of the vector between the model solution and previous model solution. Preferably this process is repeated until an improved solution results.

Repeated revisions/adjustments to the trial source location and/or activity are preferably made until the threshold is reached.

In the event that the model solution cannot be minimised, starting from a minimised number of sources, by further varying the activity or dimensional co-ordinates, but a satisfactory solution is not reached, for instance the threshold is not crosses, a second/further source location and/or activity may be introduced to the model solution. The predicted and actual detection rates for this system may be considered as described above. The variation of both sources between model solutions according to the above general procedure may be applied and/or the sources may be varied individually between model solutions. A third or yet further sources may be introduced if an acceptable solution is not reached, preferably in a similar manner.

Preferably the adjustment of the model source location/activity is stopped if the comparison meets a desired level.

If the system is analysed using a multiple number of initial sources preferably the comparison value, for instance chi$^2$ is minimised for the number of sources. Preferably the minimised solution is tested to determine whether a source can be removed without significant effect. Preferably the effect is judged against a tolerable increase in the comparison value on removing a source. The test may be made for one or more or all of the sources present. Preferably if a source can tolerably be removed it is and the analysis is reconsidered by minimising with the revised number of sources. Preferably this process is repeated until no sources can tolerably be removed. Following removal of a source the other sources are allowed to vary in activity and/or position in seeking a new minimum.

Once the adjustment of the trial source location and/or activity has been stopped a proposal for the actual source location and activity can be determined. The location may be expressed in terms of a coordinate system and/or in terms of a distance and angle(s) from a fixed point. The location may be displayed to the operator on a display unit, monitor, print out and/or displayed on the unit itself, by a light beam for instance, to allow visualisation of the sources location relative to the unit. This may allow the source location to be selectively removed and/or treated relative to the rest of the unit.

The location and/or the activity may be used to determine the subsequent processing of the volume or item analysed. The result may determine whether the volume is classed as high, intermediate or low level waste or as to whether certain subunits of the volume should be so classed depending upon whether or not they contain a source location and the level of any source they contain. The dismantling regime or the locations at which the volume is sub-divided for individual disposal may be based on the results.

According to a second aspect of the invention we provide apparatus for monitoring a neutrons source comprising:— i) a plurality of neutron detectors at known positions relative to one another;

ii) processing means for monitoring the neutron detection rates for the detectors caused by an unknown source(s);

iii) data storage means containing predicted neutron detection rates for the neutron detectors for varying source locations and source activity levels; and wherein the actual neutron detection rates are compared with the predicted neutron detection rates for a model source location and activity level; and wherein the model source locations and/or activity is adjusted to reduce the difference between the predicted and actual detection rates.

In this way apparatus is provided which enables the unknown source location and activity to be accurately modelled. The activity and/or location information may be provided to the direct or indirect operator of the apparatus.

Details of the type of neutron source, location of the neutron source and operation of the apparatus envisaged for the apparatus are discussed elsewhere within the text of this application in relation to the monitoring method and embodiments of the invention.

The neutron detectors may be of the $^3$He type. The detectors may be provided with one or more of polyethylene, boron or cadmium. The detectors may be provided with an elongate active area. A length of between 0.25 and 1.5 m may be used. A diameter of between 0.01 and 0.08 m may be used.

The neutrons detectors may be provided along a side of the volume or item to be monitored. More preferably the detectors are provided along at least two sides of the volume. Preferably detectors are provided along all six sides of the volume; that is all four "vertical sides", the top and the bottom.

The detectors may be provided in a generally horizontal and/or vertical alignment on the sides of the volume. The detectors may be provided in a generally longitudinal alignment on the top and/or bottom of the volume and/or generally perpendicular to that alignment.

The detectors maybe provided in pairs in separate detector units.

Alternative or additional detector positions are envisaged.

Preferably the detectors are portable. The detectors may be mounted directly on the volume to be monitored but more preferably a supporting frame work, preferably in a number of sections, is provided. Preferably the support structure for the detectors is portable. Preferably the frame work sections fit together in a predetermined configuration. Preferably the detectors or detector units fit on the frame work in a predetermined configuration. Preferable the processing means is portable. In this way the apparatus can be provided at the desired location of use easily.

Preferably a portion of one or more, and most preferably all, of the detectors are shielded by a neutron absorbing and/or moderating material. Preferably the shielding is provided on the side of the detectors away from the volume to be monitored. Individual detectors or pairs of detectors may be shielded individually and/or a shield extending across a series of detectors may be provided. Neutron shielding may be provided around all, or as many as are physically possible, sides of the volume. In this way neutrons from other close by sources are eliminated from the results.

One or more detectors and/or pairs of detectors may be provided with a neutron shielding material around part of their exterior. The shielding material may be provided between detectors and/or pairs of detectors. The detector and/or pair of detector may be recessed into, or between, a shielding or and/or other neutron detection restricting material. The shielding material may be provided, touching, adjacent to or merely in proximity to the detectors.

One or more detectors and/or pairs of detectors may be provided with a restricted field of view from which neutrons can be detected. Most preferably the field of view is restricted by neutron shielding material. Polyethylene, most preferably cadmium coated material.

Preferably the field of view for neutron detection for one or more of the detectors and/or pairs of detectors is restricted to an arc, about the longitudinal axis of the detector, of between 70 and 150 degrees, and more preferably between 70 and 150 degrees and ideally between 90 to 120 degrees.

Preferably one or more of the detectors and/or pairs of detectors near to the corners of the volume to be monitored are provided with a greater field of view than the other detectors. The collimating material may, for instance, be omitted from the space between the detector and the corner of the volume. In this way no blind spots within the volume exist. Preferably the detector and/or pair of detectors nearest the corner is so provided. A field of view of between 70 to 180 degrees may be provided.

According to a third aspect of the invention we provide an article and/or component thereof and/or a part thereof analysed or monitored using a method according to a first aspect of the invention and/or using apparatus according to the second aspect of the invention.

Various embodiments of the invention will now be described by way of example only and with reference to the accompanying drawings in which:—

Figure 1:
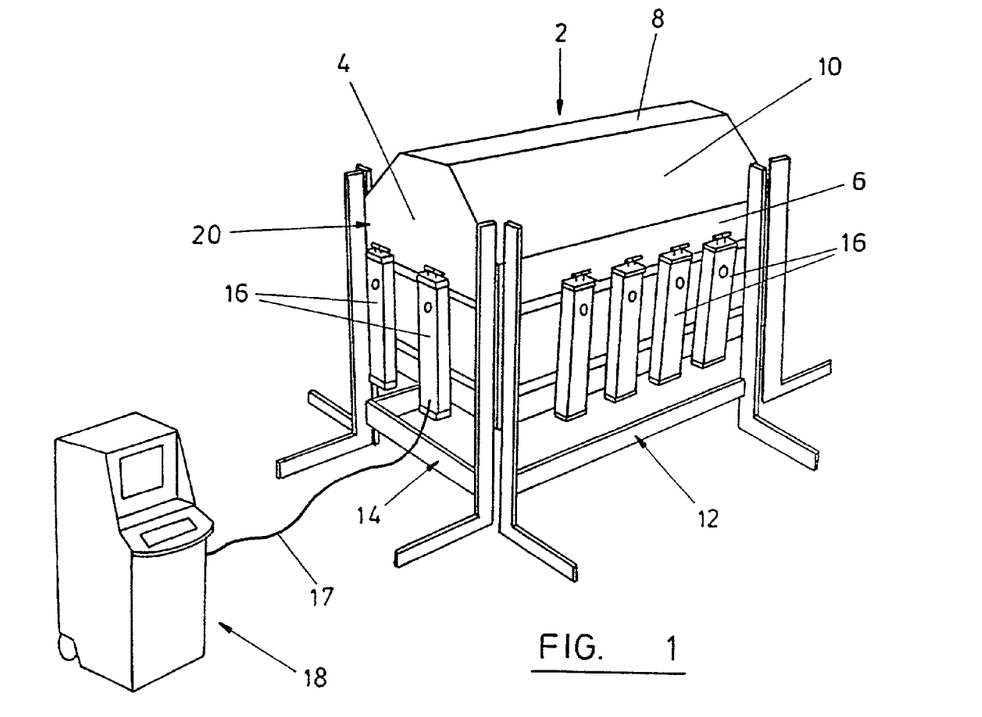
FIG. 1 illustrates a first embodiment of apparatus for analysis of a piece of equipment according to the method of the invention.

FIG. 1 illustrates apparatus according to an embodiment of the invention which enables non-destructive analysis to be performed, being deployed in the monitoring of a glove box 2. The glove box consists of a vertical end wall 4 and side walls 6 together with a horizontal top surface 8 and intervening transparent panels 10 through which the interior of the glove box can be monitored visually.

The apparatus for monitoring the glove box consists of a series or moveable frames 12 and 14 for the sides and ends of the glove box respectively. The frames consisted of a series of vertical and horizontal members which serve to support the individual neutron detecting units 16. In this case each detector unit 16 provides two detectors. Four detector units 16 are provided on each side and two more are provided on each end.

The signals from the detecting units 16 are conveyed by wire 17 to a monitoring and processing unit 18. Both the processing unit 18 and support assembly for the neutron detectors are portable.

The neutron detector units 16 each comprise two polyethylene moderated $^3$He detectors with an active length of 0.5 m×0.05 m diameter. The detectors are encased in a rectangular block, 0.75×0.2×0.11 m, of high density polyethylene.

The individual signals from each detector in each pair 16 are transmitted to the processing unit 18 and recorded individually.

To enable the method of the present invention to be performed the determination of the detection efficiency for a neutron detector of the type to be employed should be established. The detection efficiency is measured using a wide variety of known sample positions relative to the detector with a view to determining detection efficiency contours around the detector. Thus any count rate obtained relates to a range of positions/masses of the source. The contour map can be used for 2 dimensions around the detector but is more usefully determined in three dimensions.

The use of a number of such identical detectors 16 in the actual system, at known relative locations, results in an array for which the detection efficiency is known in any direction and at any distance. Thus any set of detection rates for the various detectors should be indicative of particular source location(s) and the mass present at that location.

In more detail the technique involves the allocation of an x, y and z axis about a common, predefined, point to define a three dimension reference frame for the area to be analysed. One of the axis may readily be applied to a straight edge on the glove box, such as edge 20 in FIG. 1, or other structure to be analysed. A typical glove box for analysis may be 1.5 m long, 1.2 m wide and 1.2 m high.

Particularly in the case of a 3 dimensional analysis it is desirable to provide detectors above and below the volume to be considered. Better vertical resolution is achieved as a result. Additionally or alternatively it is also desirable to provide some of the detectors in the horizontal configuration as it improves the systems ability to determine source locations in the vertical (Z) direction. This is particularly important where access above and/or below the glove box or item being monitored is not possible.

Figure 2:
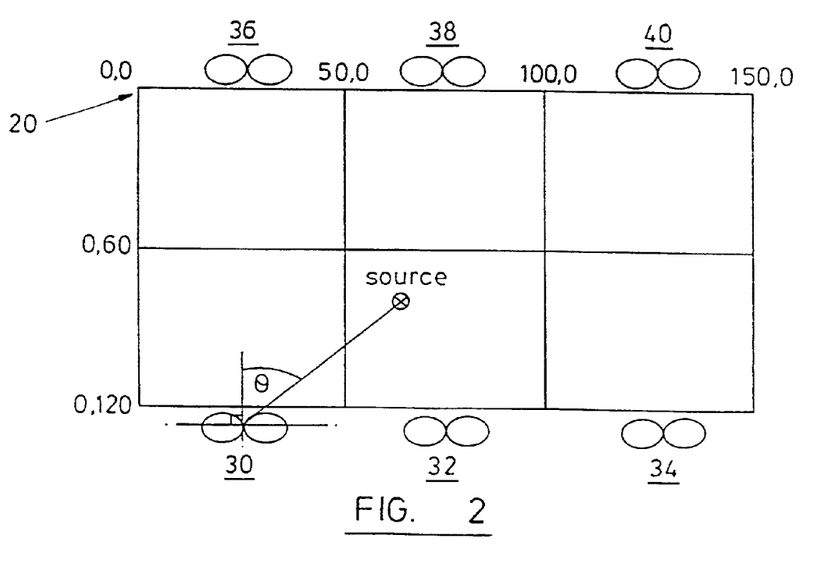
FIG. 2 illustrates schematically the allocation of positions according to an embodiment of the method of the present invention.

Taking the example of a 2 dimensional system, geometric transformations using simple trigonometry are applied to convert the x, y co-ordinates of a location into a range, r, and angle, θ, about one of the axis. The system is illustrated in FIG. 2.

The positions of the six detectors (30, 32, 34, 36, 38, 40) relative to one another and within the co-ordinate system are similarly known. Thus for any location (Q) within the co-ordinate system, a source at that location of a given mass, will allow predicted count rates for the detector models to be calculated using the detection efficiency information.

In actual use the detector array is provided around the unit to be analysed and the neutrons detected recorded. The detection events recorded for individual detectors are kept separate as well as combined in the manner of NCC analysis to determine coincidence events. The counting recordal process is performed for a sufficient period to obtain a representative count rate for each of the detectors to be obtained.

The process then proceeds to model potential solution scenarios to the information obtained from the actual counting process.

The model used in forming a solution provides a trial solution, SOLUTION A, comprising a location for a single source sample of an allocated mass. The predicted count rates for this solution are calculated using the detection efficiency contour information and compared statistically with the actual count rates detected.

The differences between the predicted and actual counts for each detector are obtained, squared and totalled to give a function of the mismatch. The trial solution is then varied with a view to minimising the total obtained (chi-squared minimum) in the following manner.

The chi-squared function for the inputs forming a solution (x,y plus activity for a 2-D model; x,y,z plus activity for a 3-D model) is evaluated as follows. The value for a particular input (either one of the dimensions or activity) of that solution is considered by calculations for that curve the gradient at a +dx point compared with the gradient at a small deviation the other side of that point, −dx. The gradient value obtained;

$$ie, \frac{\delta chi-}{\delta x_1} = \frac{chi-(a=dx)-chi^2(a-dx)}{2dx}$$

are used to determine the direction that the next variation in that input should take and also the magnitude of that variation.

The gradients for the three or four system variable for each source are taken together to provide a vector indicative of the next trial solution, SOLUTION B. The predicted count rates for SOLUTION B are then obtained using the detection efficiency data and compared with the actual measurements. The discrepancy between SOLUTION B and the actual is also compared with the previous solution, SOLUTION A, and the actual. If the previous solution, SOLUTION A, was a better fit then the new solution, SOLUTION B, is tried at the halfway point of the variation vector, SOLUTION B0.5.

If SOLUTION B0.5 is a better than SOLUTION A then the vector determination process is repeated on this solution to give SOLUTION C. The process is then repeated until a solution close enough to the actual values is obtained.

If SOLUTION B0.5 is worse than the comparison between the actual values and SOLUTION A then the new trial is made only a quarter of the way along the vector to give SOLUTION B0.25. This process is continued until a better B solution than the A solution is obtained.

As an alternative the analysis may determine the minimum chi—along the vector determined from the gradients of the various variables, a line minimisation routine, rather than a series of discrete tries.

The overall aim is to minimise the chi$^2$ value, $$X^2 = \sum_{all\ modules} \frac{(predicted - measured)^2}{(error)^2},$$

for the detectors.

Figure 3:
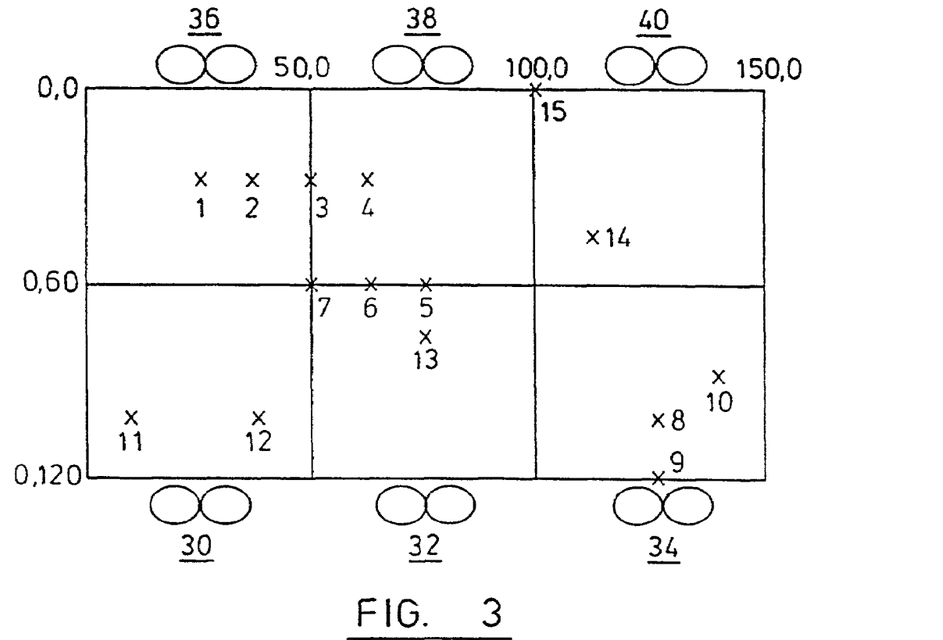
FIG. 3 provides an illustration of a number of single sources analysed according to the array of FIG. 2.

The experimental test results obtained as the determined solution to the actual source 1 illustrated in FIG. 3 are provided below. The initial estimate applied as the trial solution was x=1 cm, y=2 cm, activity=5×10$^5$ nps and the iterative process took the model solution form this point to the listed solution.

| Detector module locations: | | | | | | |
|---|---|---|---|---|---|---|
| | 36 | 38 | 40 | 34 | 32 | 30 |
| x | 25 | 75 | 125 | 125 | 75 | 25 | cm |
| y | −7 | −7 | −7 | 127 | 127 | 127 | cm |

| Trial solution: | | | True source location and activity: | | |
|---|---|---|---|---|---|
| x | 24.35 | cm | x | 25 ± 5 | cm |
| y | 28.56 | cm | y | 30 ± 5 | cm |
| activity | 5.09 × 10$^5$ | nps | activity | 4.95 × 10$^5$ | nps |

| Distance (r) and angle (θ) from source to detectors: | | | | | |
|---|---|---|---|---|---|
| #1 | #2 | #3 | #4 | #5 | #6 |
| r | 35.57 | 61.89 | 106.75 | 140.79 | 110.71 | 98.44 cm |
| θ | 1.05 | 54.93 | 70.54 | 45.64 | 27.23 | 0.38 degrees |

| Predicted channel count rates: | | | | | |
|---|---|---|---|---|---|
| #1 | #2 | #3 | #4 | #5 | #6 |
| 4658.7 | 72113.6 | 1013.1 | 689.7 | 1111.0 | 1223.6 nps |

| Observed channel count rates: | | | | | |
|---|---|---|---|---|---|
| #1 | #2 | #3 | #4 | #5 | #6 |
| 4652.4 | 2117.6 | 990.2 | 663.5 | 1161.6 | 1202.0 nps |

| Square of differences: | | | | | |
|---|---|---|---|---|---|
| 0.5 | 15.7 | 524.0 | 685.0 | 2558.7 | 467.9 | sum = 4.25 × 10$^3$ |

Clearly the results obtained represent an accurate proposal for the solution with the prediction being made with a reasonable degree of precision.

Further actual examples for the 15 source locations provided in FIG. 3 are shown below. The deviations from the actual values present relate to no more than plus or minus 5 cm, a high degree of accuracy in indicating the position of the source.

| | True source location | | | DISPIM image results | | | |
|---|---|---|---|---|---|---|---|
| | x (cm) | y (cm) | activity | x (cm) | y (cm) | activity | x$^2$ |
| #1 | 25 | 30 | 4.95 × 10$^5$ | 24 | 29 | 5.09 × 10$^5$ | 4.22 × 10$^3$ |
| #2 | 37 | 30 | 4.95 × 10$^5$ | 40 | 31 | 5.09 × 10$^5$ | 7.87 × 10$^3$ |
| #3 | 50 | 30 | 4.95 × 10$^5$ | 50 | 35 | 5.09 × 10$^5$ | 2.00 × 10$^3$ |
| #4 | 62 | 30 | 4.95 × 10$^5$ | 65 | 32 | 5.09 × 10$^5$ | 1.18 × 10$^4$ |
| #5 | 75 | 60 | 4.95 × 10$^5$ | 78 | 60 | 5.20 × 10$^5$ | 8.80 × 10$^4$ |
| #6 | 62 | 60 | 4.95 × 10$^5$ | 65 | 61 | 5.21 × 10$^5$ | 5.82 × 10$^4$ |
| #7 | 50 | 60 | 4.95 × 10$^5$ | 50 | 61 | 5.15 × 10$^5$ | 1.39 × 10$^4$ |
| #8 | 125 | 105 | 4.95 × 10$^5$ | 129 | 106 | 5.44 × 10$^5$ | 1.06 × 10$^5$ |
| #9 | 125 | 120 | 4.95 × 10$^5$ | 129 | 120 | 5.47 × 10$^5$ | 7.37 × 10$^5$ |
| #10 | 140 | 90 | 4.95 × 10$^5$ | 144 | 89 | 5.58 × 10$^5$ | 1.31 × 10$^4$ |
| #11 | 12 | 105 | 4.95 × 10$^5$ | 13 | 99 | 5.96 × 10$^5$ | 3.58 × 10$^4$ |
| #12 | 37 | 105 | 4.95 × 10$^5$ | 40 | 103 | 5.14 × 10$^5$ | 3.41 × 10$^4$ |
| #13 | 75 | 75 | 4.95 × 10$^5$ | 77 | 75 | 5.20 × 10$^5$ | 3.70 × 10$^4$ |
| #14 | 112 | 45 | 4.95 × 10$^5$ | 112 | 44 | 5.18 × 10$^5$ | 1.76 × 10$^4$ |
| #15 | 100 | 0 | 4.95 × 10$^5$ | 99 | 4 | 5.32 × 10$^5$ | 8.61 × 10$^5$ |

To provide a more versatile system and to enable the system to indicate whether any given volume of 100 liter, for instance, contains 50 g of material, the model must be able to model potentially more than one source being present. In the 2 dimensional example such a system has six degrees of freedom, the x, y coordinates and source activity for the two sets. To provide a solvable problem an equivalent or greater number of detection channels is needed.

In one multi-source technique, the trial solution initially begins with one source and allocates an initial position and activity to it. The position and/or the activity is then altered and the predicted count rates compared with the actual count rates for the two scenarios. The position and/or activity is changed repeatedly as the system attempts to fit a predicted position/activity and the consequent predicted count rates to the observed count rates, as outlined above. If the proposed solutions and actual count rates enter a situation where the chi-squared values are minimised and below a predetermined threshold then the solution is deemed final. If the chi-squared value is minimised but the threshold is exceeded then a second source is introduced to the trial solution and the process continued with the iterative process being applied to both source locations proposed in the solution. The number of sources is increased incrementally until a minimised solution below the threshold is achieved.

In an alternative multi-source technique the system commences with plurality of sources and proceeds to the solution exceeding the desired fit level which has the minimum number of sources. Further details are provided below in conjunction with FIG. 6.

In a similar manner, for a three dimensional system with up to four sources, 16 or more separate detectors would be needed to provide a unique solution to the x,y,z coordinates ordinates and source activity for four sets of source locations in the proposed solutions.

Figure 4:
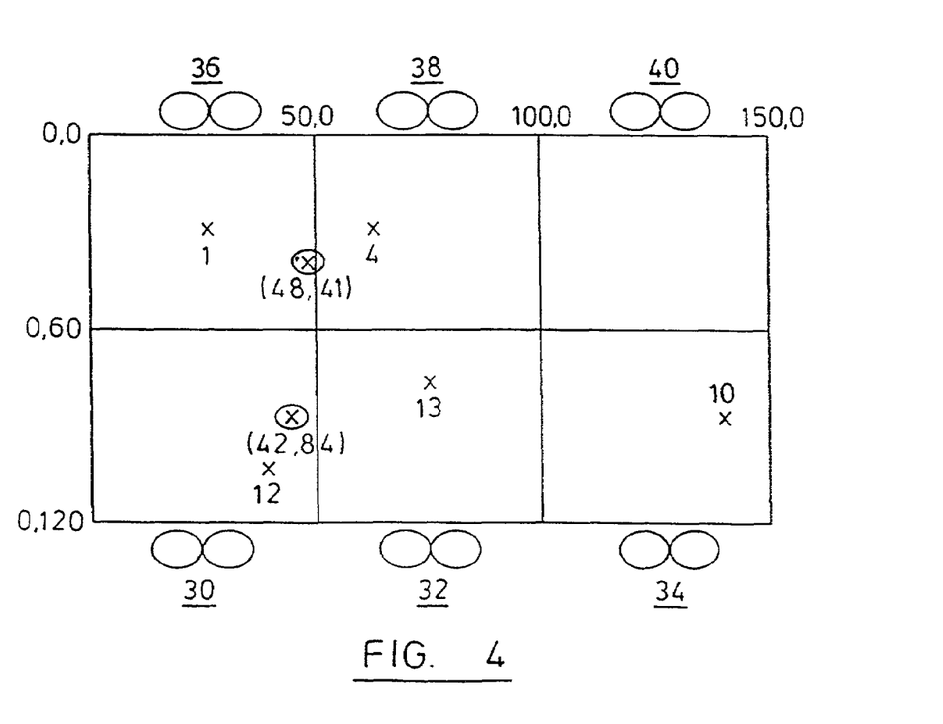
FIG. 4 illustrates the modelling of a number of pairs of sources and a quadruple source.

FIG. 4 provides an illustration of a 2 dimensional analysis for two sources at a number of locations with the following results being obtained.

Even limited to 2 sources as the model was a reasonable estimation was made as the predicted positions (4S, 41 and 42, 84) are directly between the actual positions of the four sources with the activity being predicted as twice the individual activity for each member of the actual pairs.

In the preferred system the location and activity level are provided as the modelling of both are significant in more accurately determining the activity level, rather than applying the worst case scenario, and in justifying the result. The result can, however, merely be presented as an activity level alone if the location information will not be used.

In an alternative array the vertically aligned pairs of detectors forming units 16 are replaced by horizontally aligned detectors. Each pair is replaced by four detectors of reduced active length, 0.5 m.

Figure 5:
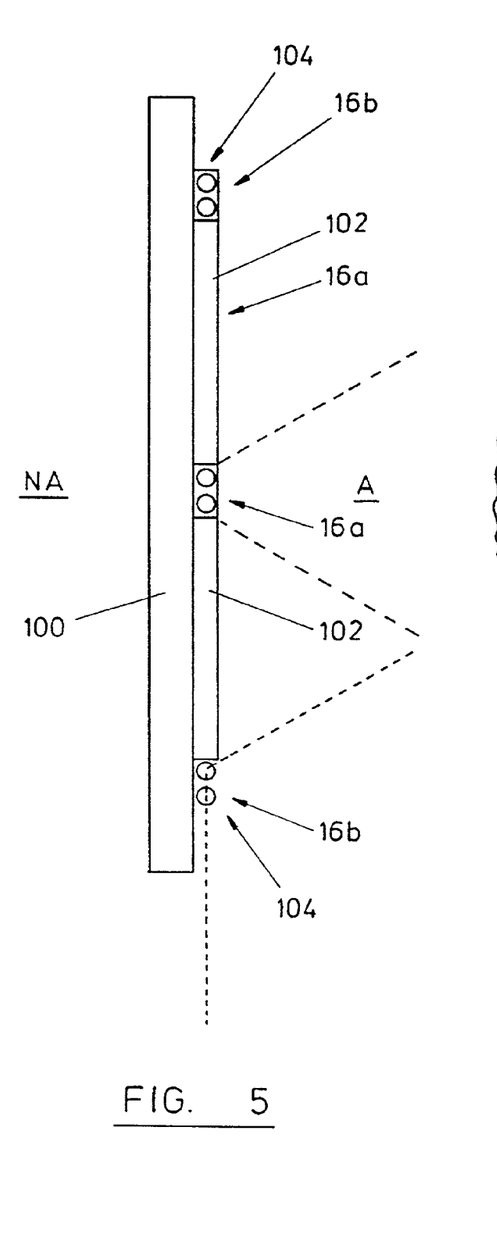
FIG. 5 illustrates an alternative array of detectors and shielding.

To assist in the resolution provided by the invention, FIG. 5 illustrates in cross-sectional plan, an alternative arrangement.

In this form the detector pairs 16 are exposed to the active side, A, containing the source(s) to be counted. The detector pairs 16 are, however, shielded from the non-active side, NA. In this consideration the non-active side is that on which no measurement is to be conducted, it may, however, be active from the point of generating count events. Indeed the level of contamination in adjacent glove boxes may be far higher than the glove box on the active side under consideration. The shield 100 reduces or eliminates the number of count events occurring on the non-active side which might otherwise be detected by the detectors and so give a false reading. A neutron absorbing material is preferred for the shield 100.

In allowing for the surroundings of the item or volume to be monitored a background count rate may be determined and subtracted to adjust the individual detectors. The determination of one single background counting rate which is applied to all of the detectors in the same way is preferred as this avoids a number of different backgrounds being

|  | True source location | | | DISPIM image results | | | |
| --- | --- | --- | --- | --- | --- | --- | --- |
|  | x (cm) | y (cm) | activity | x (cm) | y (cm) | activity | $x^2$ |
| #1 + #10 | 25 | 30 | $4.95 \times 10^5$ | 27 | 26 | $4.56 \times 10^5$ | $2.76 \times 10^{-7}$ |
|  | 140 | 90 | $4.95 \times 10^5$ | 138 | 87 | $5.58 \times 10^5$ |  |
| #1 + #12 | 25 | 30 | $4.95 \times 10^5$ | 31 | 25 | $4.74 \times 10^5$ | $1.41 \times 10^4$ |
|  | 37 | 105 | $4.95 \times 10^5$ | 42 | 110 | $4.70 \times 10^5$ |  |
| #4 + #13 | 62 | 30 | $4.95 \times 10^5$ | 66 | 32 | $5.83 \times 10^5$ | $1.11 \times 10^{-8}$ |
|  | 75 | 75 | $4.95 z 10^5$ | 77 | 83 | $4.15 \times 10^5$ |  |

Once again the locations and activities of the two sources were identified to a high degree of accuracy, once again within 5 cm in most cases.

The 2 source model was also tested against the actual counts obtained from 4 sources (1, 4, 12, 13) with the positions illustrated in FIG. 4 and with the following result.

applied which would in turn restrict the number of sources, each a variable, which could be solved.

As a further feature, also illustrated in FIG. 5, the detector pairs 16 are recessed between blocks of polyethylene 102. The two central pairs 16a are enclosed by the polyethylene on two sides whereas the pairs 16b are only enclosed on the

Figure 5A:
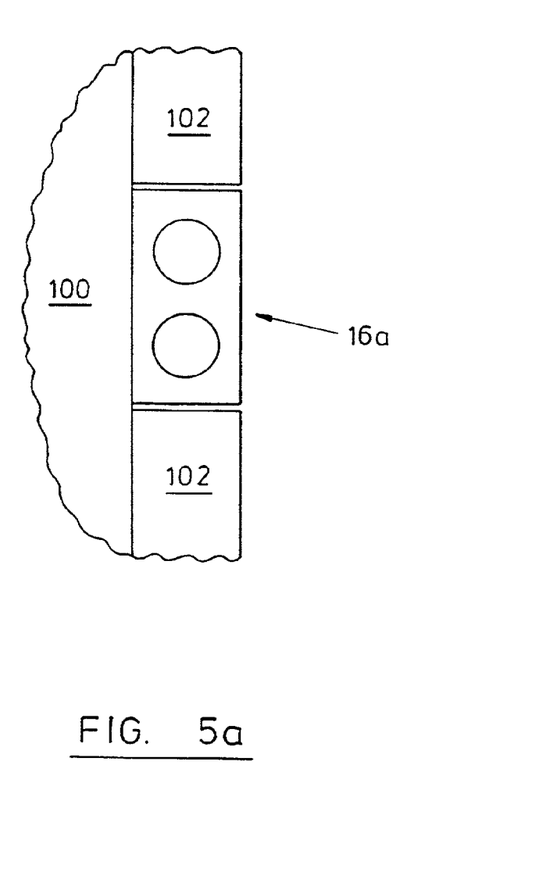
FIG. 5a shows a partial detail of FIG. 5.

|  | True source location | | | DISPIM image results | | | |
| --- | --- | --- | --- | --- | --- | --- | --- |
|  | x (cm) | y (cm) | activity | x (cm) | y (cm) | activity | $x^2$ |
| #1 + #4 | 25 | 30 | $4.95 \times 10^5$ | 48 | 41 | $1.19 \times 10^9$ | $2.57 \times 10^{-9}$ |
| +#12 | 62 | 30 | $4.95 \times 10^5$ | 42 | 84 | $1.05 \times 10^1$ |  |
| +#13 | 37 | 105 | $4.95 \times 10^5$ |  |  |  |  |
|  | 75 | 75 | $4.95 \times 10^5$ |  |  |  |  | inner side, with the outer side 104 open. The polyethylene acts as a shield/collimating material and so reduces the field of view for the detector pairs. The field of view is illustrated schematically by dashed lines for one of the detector pairs 16a and with dotted lines for one of the detector pairs 16b. As illustrated in the detail of FIG. 5 to detectors are themselves in a block of polyethylene forming the detector assembly. The reduced field of view gives improved resolution as the collimation causes greater variation in detector efficiency with source location. Small movements in source position give greater changes in count rate allowing easier, more accurate analysis. The open ends 104, however, ensure that there are no blind spots to the detector array.

Detector units are also desirably placed above and below the item to be measured to give a number of different view positions for the modelling process.

Figure 6:
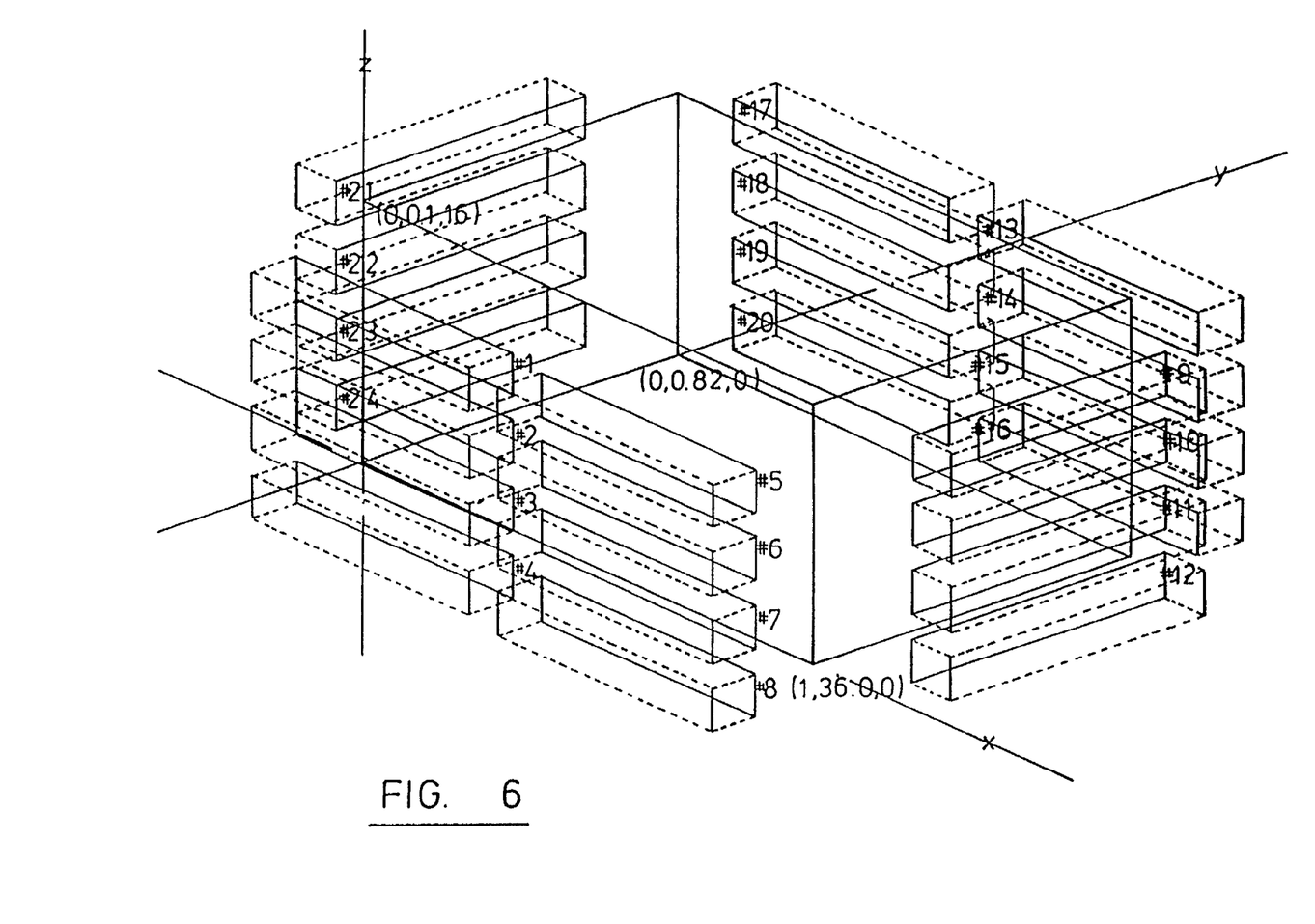
FIG. 6 illustrates an alternative detector deployment.

In an alternative configuration of the system, illustrated in FIG. 6, the detectors of the type discussed above encased in high density polyethylene are deployed in assemblies of four horizontal modules around the accessible surfaces of the glove box under consideration. In this case two assemblies are provided on each side with one further assembly on each end of the volume.

Larger numbers of assemblies and/or modules may be provided for larger vessels, for instance ranging from 1 m$^2$ glove boxes to 10 m$^3$ process vessels.

The supporting frame work of the type discussed above for the assemblies may be free standing or connected to the glove box structure.

The systems electronics and data recording facilities are provided remotely to prevent the contamination of the system components.

Once positioned around the target volume the count rate from each module in the array is independently monitored and recorded.

In this alternative embodiment the analysis starts by generating a plurality of sources in the volume each with an assigned activity.

A comparison is made between the model solution predicted count rates and the actual count rates as detailed above. Again an iterative process is used to minimise the difference using a chi-squared test between the modelled and actual count rates by varying the source locations and/or activities between one model solution and the next.

Once the chi-squared value has been minimised for a given number of sources the model seeks to determine whether any of those sources are non-essential by removing them from the model and determining the effect on the chi-squared value arising. If this chi-squared value increases by more than a pre-allocated threshold then the source is determined as essential. If, however, the sources removal does not lead to the chi-squared change exceeding this threshold then the iterative modelling procedure is repeated with one fewer sources. In repeating the procedure the locations and activities of the sources are allowed to vary. As soon as a minimised chi-squared value is achieved again then the analysis again evaluates whether any of the sources are non-essential and can be discarded.

The process repeats itself until the minimum number of sources essential to the successful modelling of the measured counts is reached. In this state the calculation indicates the relative activity and relative position of the plutonium concentration in three dimensions.

Based on whether high concentrations as point sources, fine layer depositions on a horizontal plane or other configurations of contamination are detected the subsequent treatment of the volume can be evaluated.

Commencing with multiple sources and working down offers advantageous in avoiding false minimum chi values, as well as a better total fissile content determination.

Whilst the coincidence count rates for the entire array of detectors are used in the basic monitoring of the actual source additional information can be gained from the use of the coincidence count rates from the pairs or four pairs of detectors in a unit or assembly and/or all the detectors in combination. Increased resolution arises because more measured information is available to use; NCC count rates vary strongly with position giving greater imaging; and NCC counts are less susceptible to background radiation errors.

Significantly the analysis of the present invention will never give a more dispersed solution than is actually the case, as a result, for instance, a false indication of the 50 g/100l criteria being met cannot be given.

The accuracy of the results can further be improved in situations where repeated monitoring of similar situations will occur by forming the detection efficiency contour information with the modules in their positions of use, including the field of view restrictors if applied. In this way the limited, but detectable shielding effect of the unit to be monitored can be discounted and the response of the modules tailored to their actual positions, be they on the corners of the unit or the middle of the sides.

As an alternative shielding system separate portable neutron moderating shield structures can be brought into position around the positioned detector array or around certain parts for instance between glove boxes.

The techniques outlined above produce information as to the Pu-240 eq mass in the item to be monitored. High resolution gamma spectrometer can be used to monitor the gamma spectra output from the unit and hence determine the Pu:U ratio. Other information such as the Pu and U isotopic composition and U enrichment can also be determined in this way. The Pu-240 eq and spectrometer analysis also allow the total Pu and total fissile content for the item to be calculated.

The present invention provides a number of significant advantages over prior art systems. In particular the precise location of significant concentrations and residual contamination is accurately identified by the imaging analysis system. This allows an affected and targeted clean up regime to be provided. Reduced cost and aided safety arise as a result.

Figure 7:
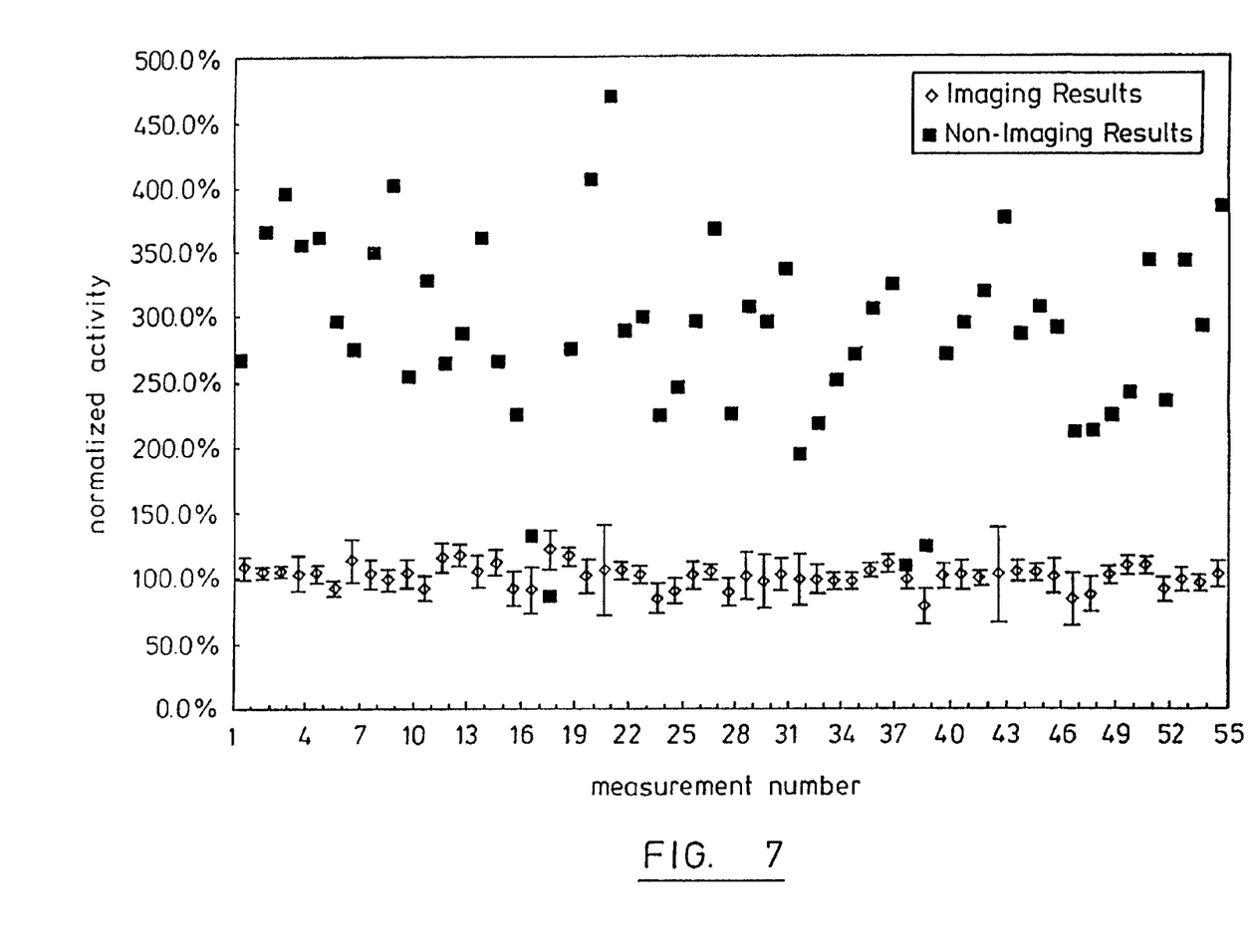
FIG. 7 illustrates normalised activity results for determinations made without and with location information.

Additionally, as the locations of residual contamination within the volume have been accurately identified a realistic value for the calibration is obtained rather than a worse case scenario in which the level of plutonium which would give that result at the least efficient detecting location has to be assumed. The benefits from this improvement are clear from FIG. 7 which displays normalised activity determinations for 55 separate analyses. The square blocks indicate the result without location determination and the diamonds the location including determination. The bars on the diamonds represent 1 standard deviation about the result.

The invention claimed is:

1. A method of monitoring at least one unknown neutron source, the method comprising:
   i) providing a plurality of neutron detectors at known positions relative to one another;
   ii) monitoring actual neutron detection rates for the neutron detectors caused by the at least one unknown neuton source;
   iii) proposing at least one model source, the at least one model source having a location relative to the neutron detectors and an activity level;

iv) predicting neutron detection rates for the at least one model source;
v) comparing the predicted and actual neutron detection rates;
vi) adjusting at least one of the following: the location of the at least one model source, the activity level for the at least one model source, and the location and activity level for the at least one model source to reduce the difference between the predicted and actual neutron detection rates.

2. A method according to claim 1 in which the predicted neutron detection rates are obtained for at least one trial solution and a plurality of sources are employed in the at least one first trial solution.

3. A method according to claim 2 in which the number of sources is reduced in further trial solutions if the model to actual comparison is minimised, and would not be increased beyond a certain tolerance if one of the sources were removed.

4. A method according to claim 1 in which the predicted neutron detection rate for one of the plurality of neutron detectors is determined from stored calibration data.

5. A method according to claim 4 in which the calibration data is obtained by determining the actual detection rates for a single one of the plurality of neutron detectors with varying source locations.

6. A method according to claim 5 in which the calibration data is obtained for the neutron detectors in their positions of use relative to one another.

7. A method according to claim 5 in which the at least one unknown neutron source is monitored with the neutron detectors positioned relative to a volume or item and the calibration data is obtained with the neutron detectors positioned relative to a replica of the volume or item.

8. A method according to claim 4 in which the calibration data is extrapolated from a number of calibration tests to provide a set of detection efficiency contour information.

9. A method according to claim 1 in which the predicted and actual neutron detection rates are compared by summing the difference between the two sets of values.

10. A method according to claim 9 in which the sum of the squares of the differences is employed as the comparison between the actual and predicted neutron detection rates.

11. A method according to claim 1 in which a revised model source is provided unless the comparison meets a certain desired limit.

12. A method according to claim 11 in which the revised model source is selected by:
determining a comparative function for the actual and predicted neutron detection rates;
determining the effect of a variation in the at least one model source; and
adjusting a subsequent model source used next according to one of the following: a directional effect and a magnitude effect suggested by the variation.

13. A method according to claim 12 in which determining the comparative function and determining the effect of the variation are determined separately for each dimensional variable for the model source locations and each activity variable for the model source locations.

14. A method according to claim 13 in which the individual variation effects are combined to give the variation between one model solution and the next.

15. A method according to claim 1 in which the at least one model source comprises a plurality of model sources, including a specified model source that is compared with a previous model source, and if the specified model source represents a poorer fit than the previous model source a revised model source is applied, the revised model source comprising a model source intermediate in one or more values to the specified model source and the previous model source.

16. A method according to claim 1 in which once adjusting the at least one model source has been stopped, a proposal for the location and the activity level of the at least one unknown neutron source is provided.

17. A method according to claim 16 in which the location is expressed in terms of a coordinate system.

18. An apparatus for monitoring at least one unknown neutron source, comprising:—
i) a plurality of neutron detectors at known positions relative to one another;
ii) processing means for monitoring the neutron detection rates for the detectors caused by the at least one unknown neuton source;
iii) data storage means containing predicted neutron detection rates for the neutron detectors for varying source locations and source activity levels; and
wherein the actual neutron detection rates are compared with the predicted neutron detection rates for at least one model source and wherein the at least one model source is adjusted in terms of at least one of the following: model source location, model source activity level, and both model source location and model source activity level to reduce the difference between the predicted and actual neutron detection rates.

19. A method according to claim 18 in which the neutron detectors are provided along at least two sides and a top and a bottom of a volume containing the at least one unknown neutron source.

20. A method according to claim 18 in which a plurality of the neutron detectors are horizontally and vertically separated from one another.

21. A method according to claim 18 in which the relative positions of the neutron detectors to one another are considered in at least two dimensions using a coordinate system.

22. A method according to claim 21 in which the coordinate system is defined about one of: a fixed point corresponding to one of the detectors, and a fixed point on an item to be monitored.

23. A method according to claim 21 in which at least one axis of the coordinate system is defined to correspond to at least one edge of an item to be monitored.

24. A method according to claim 18 in which the relative positions of the neutron detectors to one another are considered in at least two dimensions in terms of a distance and angle system, wherein at least one edge of an item to be monitored forms an axis relative to which at least one angle is determined.

25. A method according to claim 18 in which at least one of the neutron detectors is provided with a restricted field of view from which neutrons can be detected, the field of view being restricted by neutron shielding material.

26. A method according to claim 25 in which the field of view for neutron detection for the at least one neutron detector is restricted to an arc, about the individual axis of the at least one neutron detector, of between 10 and 150 degrees.

27. A method according to claim 25 in which at least one of the neutron detectors near to the corners of the volume to be monitored is provided with a greater field of view than other of the neutron detectors.

28. A method according to claim 4 in which the calibration data is obtained by determining the actual neutron detection rates for a single one of the neutron detectors with varying source activities.

29. A method according to claim 16 in which the location is expressed in terms of a distance and at least one angle from a fixed point.

30. A method according to claim 18 in which the relative positions of the neutron detectors to one another are considered in at least two dimensions in terms of a distance and at least one angle.

* * * * *